(12) United States Patent
Spencer

(10) Patent No.: US 6,823,417 B2
(45) Date of Patent: Nov. 23, 2004

(54) MEMORY CONTROLLER FOR MEMORY CARD MANAGES FILE ALLOCATION TABLE

(75) Inventor: Andrew M. Spencer, Eagle, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 480 days.

(21) Appl. No.: 09/966,271

(22) Filed: Oct. 1, 2001

(65) Prior Publication Data

US 2003/0065866 A1 Apr. 3, 2003

(51) Int. Cl.[7] .................. G06F 13/14; G06F 12/00
(52) U.S. Cl. .................. 710/305; 710/306; 711/207
(58) Field of Search .................. 710/305, 306; 711/103, 202, 205, 206, 207, 209, 221; 365/185.33

(56) References Cited

U.S. PATENT DOCUMENTS

| | | | |
|---|---|---|---|
| 5,535,369 A | | 7/1996 | Wells et al. |
| 5,715,455 A | | 2/1998 | Macon, Jr. et al. |
| 5,841,699 A | * | 11/1998 | Miyauchi ............... 365/185.33 |
| 5,946,714 A | * | 8/1999 | Miyauchi ............... 711/205 |
| 6,189,081 B1 | | 2/2001 | Fujio |
| 6,704,852 B2 | * | 3/2004 | Lai et al. ............... 711/206 |

FOREIGN PATENT DOCUMENTS

JP    07 0295866    11/1995

* cited by examiner

*Primary Examiner*—Khanh Dang

(57) ABSTRACT

A memory card controller controls the file allocation table and file system structures of a memory card, in order to speed up data transfer to and from the memory card and a host device, such as a digital camera. The memory card controller includes a memory to store the file allocation table, and a processor to update the file allocation table and file system structures based on access commands received from the host device.

17 Claims, 3 Drawing Sheets

| | FAT 500 |
|---|---|
| 0000 | 0000 |
| 0001 | FFF7 |
| 0002 | 0000 |
| . . . | |
| 000F | 0100 |
| 0010 | 0100 |
| . . . | |
| FFFE | 0100 |
| FFFF | 0000 |

MEMORY CONTROLLER FOR MEMORY CARD MANAGES FILE ALLOCATION TABLE

BACKGROUND OF THE INVENTION

A. Field of the Invention

The invention relates generally to a memory card controller that manages a file allocation table, descriptor files and system area of a memory card.

B. Description of the Related Art

Memory cards are becoming more and more prevalent for use by various types of devices. Such devices include digital music players and cameras, personal digital assistants (PDAs), video cameras, cellular phones, and other digital consumer electronics products.

Memory cards are useful in that they are easily inserted and removed from host devices. Memory cards may be of the flash-memory variety, or of another type of memory storage capability. Memory cards provide a compact, reliable, and easy-to-use storage medium to store large amounts of video, audio, and other data for various types of host devices.

When a host device obtains information from a memory card, or when the host device seeks to write data to the memory card, an interface between the host device and the memory card is utilized in order to deal with the potentially different bus sizes and the potentially different data transfer protocols utilized by the two devices. A memory card controller is used as an interface for the transfer of data from the memory card to the host device and for the transfer of data from the host device to the memory card.

For example, a memory card controller provides a multi-block read/write capability for data to be read into or to be read from a memory card, such as on a sector-by-sector basis. Based on an access command output by the host device, the memory card controller accesses storage locations of the memory card in order to accommodate the access command. As explained above, the access command may be for a write of data to the memory card, or for a read of data from the memory card.

The memory card controller manages the interface between the memory card and the host device, and is tied to that interface. The memory card controller includes a memory for storing data to be written into the memory card or to be read from the memory card, and functions as a buffer between these two devices. The memory card controller also includes a processor that performs various access functions on the memory card based on access requests made by the host device.

Many conventional host devices use the structures defined in ISO Standard 9293 or similar standards to manage the files on the memory card. This standard defines the FDC Descriptor, System Area, Root Directory and file allocation table (FAT) as the structures to be maintained. When such a host device seeks to either write data to a memory card or to read data from the memory card, the host device must first obtain the FAT from the memory card. If the memory card is not formatted, then the host device must format the memory card and set up a memory region in the memory card where the FDC Descriptor, System Area, Root Directory and FAT is to be stored.

The host device prepares the FAT, or obtains a previously-prepared FAT from the memory card. Once the FAT has been read from the memory card to the host device, the host device determines available memory space in the memory card to write a particular-sized file to (for a memory write operation), or the host device determines where in the memory card a particular file is stored (for a memory read operation). With this information, the host device can send the appropriate access commands to the memory card controller to obtain a desired file currently stored on the memory card, or it can send the appropriate access commands to the memory card controller to write a file onto an available unused region (e.g., one or more sectors or clusters) of the memory card.

The inventor of the present invention has realized that, due to the larger-sized FATs that are currently being used or considering to be used for large-storage-capacity memory cards using many of the available host interfaces, the time to transfer an entire FAT from a memory card to a host device can be fairly long (e.g., several seconds or more), which is an undesired feature. Thus, the present invention provides for file management of the memory card in a quicker and more efficient way.

SUMMARY OF THE INVENTION

According to one aspect of the invention, there is provided a memory card controller, which includes a memory that stores a FDC Descriptor, System Area, Root Directory (called file system structures hereon after) and file allocation table for a memory card to be controlled by the memory card controller. The memory card controller also includes a processor that manages the file allocation table and file system structures based on requests made by a host with respect to information to be retrieved from the memory card or with respect to information to be stored on the memory card.

According to another aspect of the invention, there is provided a method of determining whether a file write request output from a host device for writing a file to a memory card can be accommodated. The method includes a step of obtaining, by a memory card controller that provides a communications interface between the memory card and the host device, a file allocation table (FAT) and file system structures stored on the memory card. The method also includes a step of storing the FAT and file system structures on the memory card controller. The method further includes a step of determining, by the memory card controller based on information obtained from the FAT, whether the memory card has sufficient available storage space to fulfill the file write request made by the host device. The method still further includes a step of informing the host device as to whether or not the file write request can be fulfilled.

According to yet another aspect of the invention, there is provided a method of determining whether a file read request output from a host device for reading a file from a memory card can be accommodated. The method includes a step of obtaining, by the host device, information regarding names of files stored on the memory card. The method also includes a step of outputting, by the host device, the memory read request to read a particular one of the files stored on the memory card. The method further includes a step of obtaining, by a memory card controller that provides a communications interface between the memory card and the host device, a file allocation table (FAT) and file system structures stored on the memory card to determine storage locations on the memory card whereby the particular one of the files is stored. The method still further includes a step of storing the FAT and file system structures on the memory card controller. The method also includes a step of providing the particular one of the files to the host device from the memory card to the host device, under control of the memory card controller.

According to yet another aspect of the invention, there is provided a method of determining whether a file copy request from a host device for copy a file from a memory card can be accommodated. The method includes a step of obtaining, by the host device, information regarding names of file to be copied on the memory card. The method still further includes a step of determining where within the FAT on the memory card controller the file to be copied is located and assessing how much space the file occupies. The method further includes a step of determining, by the memory card controller based on information obtained from the FAT, whether the memory card has sufficient available storage space to fulfill the file copy request made by the host device. The method still further includes a step of informing the host device as to whether or not the file copy request can be fulfilled. The method also includes a step of, under control of the memory card controller, copying the file to a new location and updating the FAT and file system structures to record the location of the copied file.

According to yet another aspect of the invention, there is provided a method of determining whether a file move request from a host device for copy a file from a memory card can be accommodated. The method includes a step of obtaining, by the host device, information regarding names of file to be moved on the memory card and the directory location. The method still further includes a step of determining where within the FAT on the memory card controller the file to be moved is located. The method also includes a step of, under control of the memory card controller, moving the file to a new location and updating the FAT and file system structures to record the location of the moved file.

According to yet another aspect of the invention, there is provided a method of determining whether a file delete request from a host device for deleting a file from a memory card can be accommodated. The method includes a step of obtaining, by the host device, information regarding names of files to be deleted on the memory card. The method still further includes a step of determining where within the FAT on the memory card controller the file to be deleted is located. The method also includes a step of, under control of the memory card controller, updating the FAT and file system structures to remove the requested file.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Preferred embodiments of the invention will be described in detail with reference to the drawings.

Figure 1:
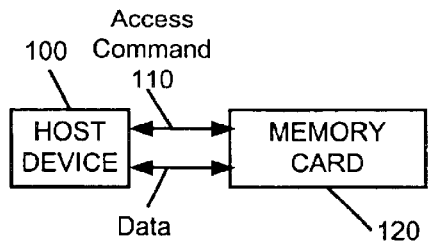
FIG. 1 is a block diagram of a host device communicatively connected to a memory card, according to either the first or second embodiments of the invention.

As discussed above, the conventional way of obtaining information from a memory card or of writing data to a memory card is via the host device managing the FAT of the memory card. FIG. 1 shows a host device 100 communicatively connected to a memory card 120, whereby access commands 110 are sent to the memory card 120 via command lines or where the commands lines indicate whether the data on the data lines is a command or data, and whereby data is passed between the host device 100 and the memory card 120 via data lines.

The FAT is a table that is typically stored in an initial sector or partition of the memory card 120, and it, along with the and file system structures (flexible disk cartridge (FDC) descriptor and Root Directory), are used to keep track of which part of a file is stored in which sector of the memory card 120. The sector size used by most current cards is typically 512 bytes, but other sector sizes may be contemplated while remaining within the scope of the invention as described herein. Among other information the, FDC descriptor contains the information that indicates how many sectors per cluster is used by the file system.

Figures 6, 7:
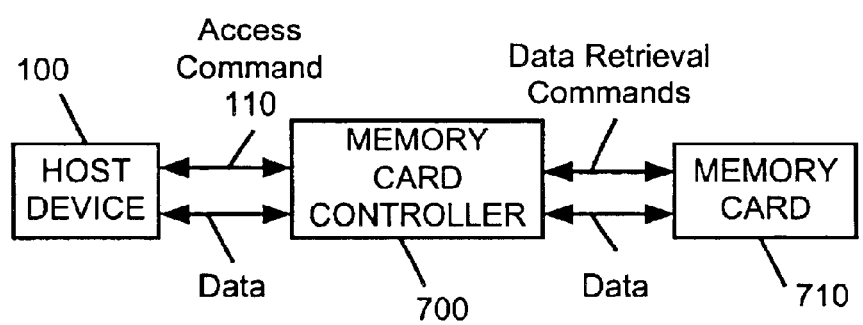
FIG. 6 is a diagram of a typical File Allocation Table.
FIG. 7 shows a controller that is provided between a host device and a memory card, according to a third embodiment of the invention.

Typically, the memory card 120 has two FATs stored in its first sector. The two FATs are identical, and can be looked at as a two-column spreadsheet. FIG. 6 shows a typical FAT 500. The left column of the FAT 500 gives each cluster a number (in hex, typically) from 0000 to $FFFF_{hex}$ (65,536 clusters total). This size is for a 16-bit FAT. If a 32-bit FAT is used, then the left column gives each cluster a number from 0000 to $FFFFFFFF_{hex}$. The right column of the FAT 500 contains information on the status of each sector. That is, whether the pertinent sector is currently storing data or not. During formatting, any bad sectors are marked with a particular status code (e.g., $FFF7_{hex}$ for a 16-bit FAT), and good sectors are marked with a different status code (e.g for a 16 bit FAT, $0000_{hex}$ for unused and available, and $OFF8_{hex}$ to $OFFF_{hex}$ to indicate that this cluster is in use, is unavailable and contains the last of the data of a given file or contains the number of the next cluster that contains data for a given file).

The 16-bit FAT system, or FAT-16, can address 65,536 ($2^{16}$) locations. Therefore, the size of the memory card partition should be limited to 65,536×512 bytes per sector (standard sector size)* Number of sectors per cluster, or 32 Mbytes for a 1 sector per cluster file system. To obtain partitioning for memory cards larger than 32 Mbytes in storage capacity, clustering is used. Clustering is a concept which combines a set of contiguous sectors and treats them as a single unit in the FAT. The number of sectors in each cluster is determined by the size of the partition. In FAT-16, there can be no more than 65,536 clusters.

Windows 98 and later versions of Windows (e.g., Windows Millennium Edition) support the FAT32 file system. FAT32 can create partitions up to 2 terabytes in size, and uses smaller clusters than FAT16. This results in a more efficient use of space on a large capacity memory card. Therefore, FAT32 is typically preferred over FAT16 for larger capacity memory cards.

However, FAT32 tables are larger in size than FAT16 tables, and thus take a longer time to download and read by the host device 100 that has to manage the FAT 500. For example, a FAT16 table may be around 200 kBytes in size, while a FAT32 table may be around 2 Mbytes in size.

When the host device 100 makes a read access request for reading data from the memory card 120, it has to first retrieve the FAT 500 from a particular region of the memory card 120, in order to determine where a desired file is located on the memory card 120. Once it has read the FAT 500 from the memory card 120 (by way of a data transfer from the memory card 120 to the host device 100, under control of a memory card controller), the host device 100 determines the sector locations where the desired file is stored on the memory card 120, and then the host device 100 sends a series of access commands to the memory card controller to retrieve blocks of data from the memory card 120 that correspond to the desired file.

The present invention improves the file system management by having the memory card controller 130, which is included on the memory card 120 in the first embodiment, perform the FAT, FDC descriptor and Root Directory management and in the second embodiment perform the FAT management instead of having the host device 100 perform these functions. In that regard, the memory card controller 130 provides the command interface to emulate, in the first embodiment the file management module and in the second embodiment the FAT module, that is implemented in software on the host device of conventional host devices.

Figure 2:
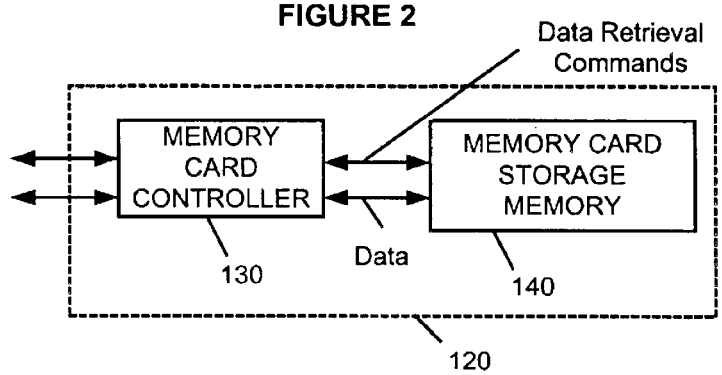
FIG. 2 is a block diagram of a memory card according to either the first or second embodiments of the invention, which includes a memory card controller and a memory card storage memory.

FIG. 2 shows the memory card 120 according to the first and second embodiments of the invention. The memory card 120 includes a memory card controller 130 and a memory card storage memory 140. The memory card controller 130 sends data retrieval commands to the memory card storage memory 140, and data is passed between the memory card controller 130 and the memory card storage memory 140 via data lines.

In the present invention, the host device 100 is not sent the entire FAT 500 before an access request is made. Rather, the FAT 500 is managed by the memory card controller 130, which can more quickly retrieve the FAT 500 due to the processor of the memory card controller 130 being of a higher bandwidth capability and being dedicated to data transfer, as opposed to the processor of the host device 100 (which has to perform other functions besides data transfer to and from the memory card 120 and which in many cases limited in data transfer by the host bus).

In the present invention, when the host device 100 wants to write a file to the memory card 120, instead of being sent the entire FAT 500 and then having to determine where an appropriate sector or sectors to store the file on the memory card 120 is located, those functions are left to the memory card controller 130 to do.

FIG. 1 shows a host device 100 outputting an access command 110 to write a data file to a memory card 120. Referring now to FIG. 2, the memory card controller 130 receives the access command output from the host device 100, and obtains the FAT 500 of the memory card 120 from the memory card storage memory 140. As a first alternative to the FAT retrieval described above, the memory card controller 130 accesses the FAT 500 at power up and stores the FAT 500 and file system structures in memory 210, whereby the memory card controller 130 does not have to obtain the FAT 500 from the memory card storage memory 140 again in response to an access command that it receives. As a second alternative to the FAT retrieval described above, the memory card controller 130 determines the location of the FAT 500 in the memory card storage memory 140, whereby the memory card controller 130 only keeps a portion of the FAT 500 that is to be updated in memory 210.

A processor (not shown, but see FIG. 3) of the memory card controller 130 determines if available memory space exists on the memory card 120 to handle the file write request made by the host device 100. This determination is made by reading the FAT 500 and determining if enough unused memory space (e.g., available sectors or clusters) exists on the memory card 120 to store the file to be sent from the host device 100.

If sufficient memory space exists on the memory card 120, then the file transfer can begin, based on a message sent from the memory card controller 130 to the host device 100 to begin the file transfer.

The file transfer can occur in one of two ways. In a first embodiment, the FAT 500 is entirely managed and controlled by the memory card controller 130. In that case, as data is being sent from the host device 100 to the memory card controller 130, the memory card controller 130 outputs blocks of data at a time to be stored in particular storage locations in the memory card 120, and the memory card controller 130 updates the FAT 500 accordingly. The host device 100 does not utilize the FAT 500 in any way in the first embodiment, and is not sent any portion of the FAT 500.

In a second embodiment of the invention, in response to an access command from the host device 100, such as a command to write a data file to the memory card 120, the memory card controller 130 determines whether available storage spaces exists on the memory card 120, by reading and analyzing the FAT 500 of the memory card 120 as provided to it from the memory card storage memory 140. If sufficient memory space exists, the memory card controller 130 outputs to the host device 100 information concerning the available sectors or clusters on the memory card 120, and the host device 100 outputs data to the memory card controller 130 to fill up each of those available sectors or clusters on the memory card 120, until the file is fully written onto the memory card 120. Thus, in the second embodiment, very small portions of the FAT 500 (or data extracted from very small portions of the FAT 500) are provided to the host device 100.

In both the first and second embodiments, the entire FAT is not sent to the host device 100, thereby speeding up the file transfer process. Also, by putting the FAT management on the memory card controller 130, the host device 100 is freed up to perform other tasks that it needs to perform.

Figure 3:
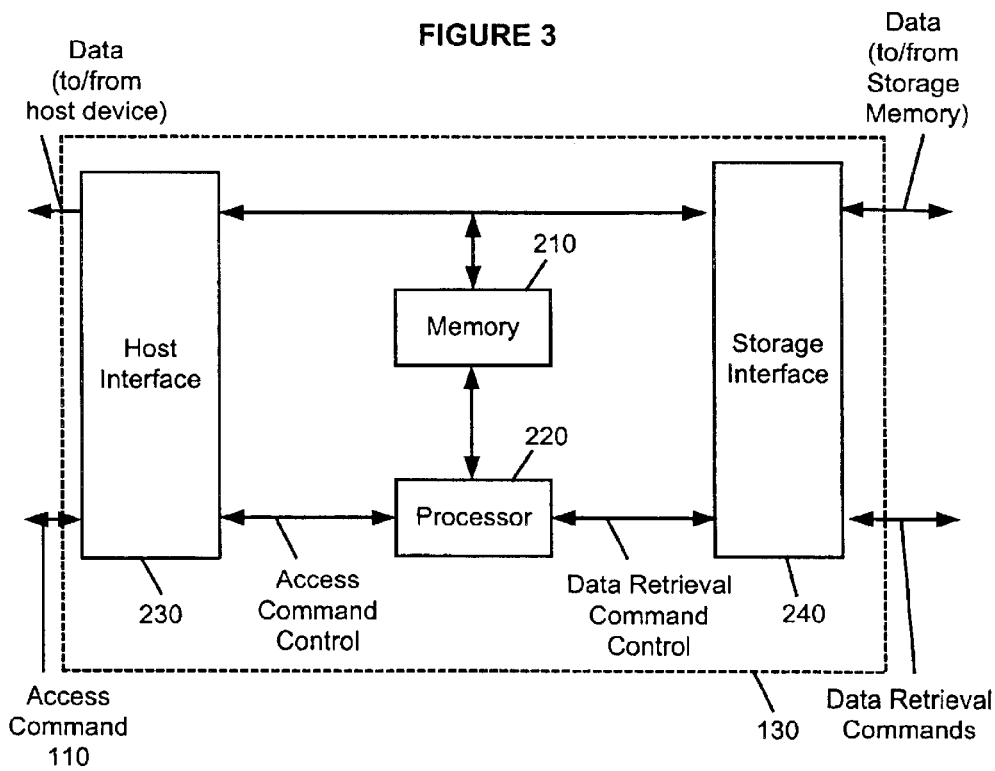
FIG. 3 is a block diagram of elements making up memory card controller according to either the first or second embodiments of the invention.

In the first or second embodiments, the memory card controller 130 has a memory or storage capability, such as a static random access memory (SRAM) or a reserved area within the memory card storage memory 140, which is used to store the FAT 500 that is obtained from the memory card 120. FIG. 3 shows the memory card controller 130 according to either the first or second embodiments, which includes a processor 220 and a memory 210. The processor 220 manages the FAT and responds to access commands received from the host device 100, to either read data from the memory card 120 or to write data to the memory card 120. The memory card controller 130 also includes a host interface 230 which provides an interface for data and command sent between the memory card controller 130 and the host device 100. The memory card controller 130 further includes a storage interface 240 which provides an interface for data and commands sent between the memory card controller 130 and the memory card storage memory 140.

In the first embodiment, the processor 220 responds to the same set of access commands that are output by a conventional host device, and the processor 220 maintains and updates the FAT, FDC and Root Directory of the memory card 120 while fulfilling the access commands. Those access commands include: 1) write of N sectors of data to a memory card starting at location A, 2) read of M sectors of data from a memory card starting at location B, 3) free up Z sectors of contiguous memory space on the memory card starting at location C. The access commands output from the host device also include: 1) listing of files on the memory card, 2) moving of files on the memory card, 3) deleting of files on the memory card, and 4) copying of files from the memory card.

Figure 4:
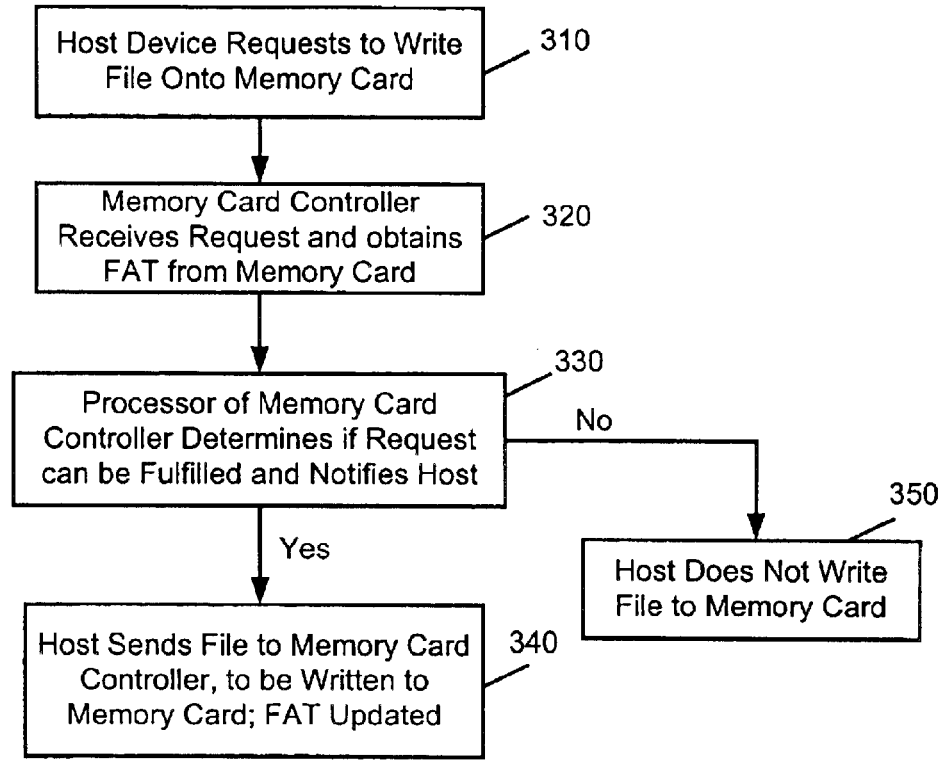
FIG. 4 is a flow chart of the steps involved in a file write access request made by a host device.

FIG. 4 shows the steps involved in a file write request. According to the first embodiment of the invention, in a first step 310, the host device 100 requests to write a file of a particular size, e.g., 1.5 Mbytes, onto the memory card 120. In a second step 320, the memory card controller 130 receives that request, and then either obtains the FAT of the memory card 120 from a predetermined sector or sectors of the memory card 120, or it obtains the FAT from the SRAM of the memory card controller 130 if the FAT has already been transferred there.

In a third step 330, the processor 220 of the memory card controller 130 determines if the memory card 120 has sufficient available storage space to fulfill the file write request made by the host device 100. In doing so, the memory card controller 130 performs functions that were performed by the conventional host device 100 in determining whether sufficient memory space exists on the memory card 120.

Also in the third step 330, the memory card controller 130 informs the host device 100 as to whether or not the file write request can be fulfilled. If yes, and as shown in step 340, then the host device 100 sends the file to the memory card controller 130, which writes it into the available sectors on the memory card 120, while at the same time updating the FAT of the memory card 120 to indicate that those available sectors are no longer available (as well as indicating the name of the file stored in those sectors). If no, and as shown in step 350, then the host device 100 does not write the file to the memory card 120.

In the second embodiment, the memory card controller 130 indicates the available storage locations and sizes to the host device 100, and the host device 100 would act on that information to then transfer sectors of data for the file to the memory card 120, by way of the memory card controller 130. The host device 100 is not provided with the entire FAT, but just with the necessary information so that it can send the appropriate sectors of data consecutively to the memory card 120 (e.g., host device 100 sends the entire file, e.g., 150 sectors for a 75 kByte file, as a continuous data stream, to the memory card, whereby the memory card controller would take care of writing the file into the appropriate, available clusters of the memory card.).

In the second embodiment, while the memory card controller 130 performs FAT management and FAT updating, the host device 100 is provided with the necessary information of data of a file stored on the memory card 120, so that the host device 100 can issue the appropriate set of access commands to retrieve that file.

In the first embodiment, all of the FAT management and FAT updating is done by the memory card controller 130, and thus the host device 100 only has to output the data file to be written to the memory card 120, and the host device 100 is not provided with any FAT information as to the memory locations (e.g., sectors or clusters) of the memory card 120 on which the data file is being written to by the memory card controller 130. The memory card controller 130 exclusively maintains that information.

Figure 5:
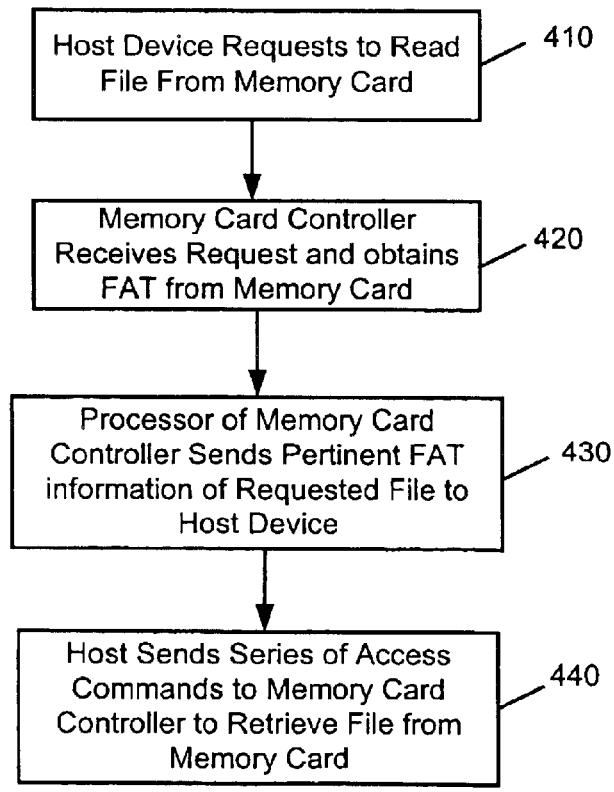
FIG. 5 is a flow chart of the steps involved in a file read access request made by the host device.

FIG. 5 shows the steps involved in a file read request according to the either embodiment of the invention. In a first step 410, the host device 100 outputs a request to read a file from the memory card 120. In a second step 420, the memory card controller 130 receives that request and obtains the FAT from the memory card 120 (if it had not already previously obtained it). In a third step 430, the memory card controller 130 obtains the pertinent FAT information for the requested file from the FAT, and provides that information to the host device 100. In a fourth step 440, the host device outputs access commands to obtain portions of stored data in the memory card 100, which correspond to the requested file.

In a third embodiment of the invention, the memory card is a conventional memory card, whereby the functions of the memory card controller 130 described above with respect to the first and second embodiments are provided by way of a controller unit that is disposed between a memory card 710 and the host device 100. FIG. 7 shows such a configuration, whereby controller unit 700 provides the FAT management functions that are done by the memory card controller 130 of either the first and second embodiments. In the third embodiment, the controller unit 700 is separate from the host device 100 and separate from the memory card 710.

Thus, a memory card controller that manages the file allocation table of a memory card, and a method for managing a file allocation table of a memory card, have been described according to several embodiments of the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention.

What is claimed is:

1. A memory card controller, comprising:
   a memory that stores a file allocation table and file system structures for a memory card to be controlled by the memory card controller; and
   a processor that is communicatively coupled to the memory, wherein the processor manages the file allocation table and file system structures based on requests made by a host device with respect to information to be retrieved from the memory card or with respect to information to be stored on the memory card,
   wherein the processor is configured to determine available sectors within the memory card based on a write request made by the host device, and
   wherein the processor provides information corresponding to the available sectors, as a portion of the file allocation table, to the host device, so that the host device can output data and sector information that identify to which sectors in the memory card the data is to be written into.

2. The memory card controller according to claim 1, wherein the memory is a random access memory or a storage memory of the memory card.

3. The memory card controller according to claim 2, wherein the random access memory is a static random access memory.

4. The memory card controller according to claim 1, wherein the host device is one of a personal digital assistant, a digital camera, and a cellular phone.

5. The memory card controller according to claim 1, wherein memory card controller is provided on a first chip, the memory card is provided on a second chip, and the host device is provided on a third chip.

6. A method of determining whether a file write request output from a host device for writing a file to a memory card can be accommodated, comprising:
obtaining, by a memory card controller that provides a communications interface between the memory card and the host device, a file allocation table (FAT) and file system structures stored on the memory card;
storing the FAT and file system structures at the memory card controller;
determining, by the memory card controller based on information obtained from the FAT, whether the memory card has sufficient available storage space to fulfill the file write request made by the host device;
informing the host device as to whether or not the file write request can be fulfilled; and
providing the host device with a portion of the FAT corresponding to which sectors in the memory card are available to store data of the file write request, when it is determined that the file write request can be fulfilled.

7. The method according to claim 6, wherein the storing step is performed by storing the FAT and file system structures onto a random access memory of the memory card controller.

8. The method according to claim 7, wherein the random access memory is a static random access memory or a storage memory of the memory card.

9. The method according to claim 6, wherein the host device is one of a personal digital assistant, a digital camera, a digital music player, a video camera, and a cellular phone.

10. A method of determining whether a file read request output from a host device for reading a file from a memory card can be accommodated, comprising:
obtaining, by the host device, information regarding names of files stored on the memory card;
outputting, by the host device, the memory read request to read a particular one of the files stored on the memory card;
obtaining, by a memory card controller that provides a communications interface between the memory card and the host device, a file allocation table (FAT) and file system structures stored on the memory card to determine storage locations on the memory card whereby the particular one of the files is stored;
storing the FAT and file system structures on the memory card controller;
providing the particular one of the files to the host device from the memory card to the host device, under control of the memory card controller; and
providing the host device with a portion of the FAT corresponding to the storage locations on the memory card which the particular one of the files was retrieved from.

11. The method according to claim 10, wherein the storing step is performed by storing the FAT and file system structures onto a random access memory of the memory card controller.

12. The method according to claim 11, wherein the random access memory is a static random access memory or a storage memory of the memory card.

13. The method according to claim 10, wherein the host device is one of a personal digital assistant, a digital camera, and a cellular phone.

14. The method according to claim 10, wherein the providing step comprises the following substeps:
informing the host device as to all storage locations on the memory card that the particular one of the files is stored; and
providing commands, by the host device to the memory card controller, to obtain contiguous storage locations of the memory card; and
obtaining the contiguous storage locations from the memory card to the host device under control of the memory card controller.

15. A method of determining whether a file copy request from a host device for copy a file from a memory card can be accommodated, comprising:
obtaining, by the host device, information regarding names of file to be copied on the memory card;
determining where within a file allocation table (FAT) on the memory card controller the file to be copied is located and assessing how much space the file occupies;
determining, by a memory card controller based on information obtained from the FAT, whether the memory card has sufficient available storage space to fulfill the file copy request made by the host device;
informing the host device as to whether or not the file copy request can be fulfilled;
copying, under control of the memory card controller, the file to a new location and updating the FAT and file system structures to record the location of the copied file; and
providing the host device with a portion of the FAT corresponding to the new location within the memory card which the file was copied to.

16. A method of determining whether a file move request from a host device for copy a file from a memory card can be accommodated, comprising:
obtaining, by the host device, information regarding names of file to be moved on the memory card and the directory location;
determining where within a file allocation table (FAT) on the memory card controller the file to be moved is located;
moving, under control of a memory card controller, the file to a new location and updating the FAT, FOG Descriptor and Root directory to record the location of the moved file; and
providing the host device with a portion of the FAT corresponding to the location of the moved file within the memory card.

17. A method of determining whether a file delete request from a host device for deleting a file from a memory card can be accommodated, comprising:
obtaining, by the host device, information regarding names of files to be deleted on the memory card;
determining where within a file allocation table (FAT) on a memory card controller the file to be deleted is located; and
updating, under control of the memory card controller, the FAT and file system structures to remove the requested file; and
providing the host device with a portion of the FAT corresponding to locations within the memory card in which the requested file was stored prior to its removal.

* * * * *